(No Model.)
P. DANSEREAU.
BALL BEARING.
No. 494,190. Patented Mar. 28, 1893.
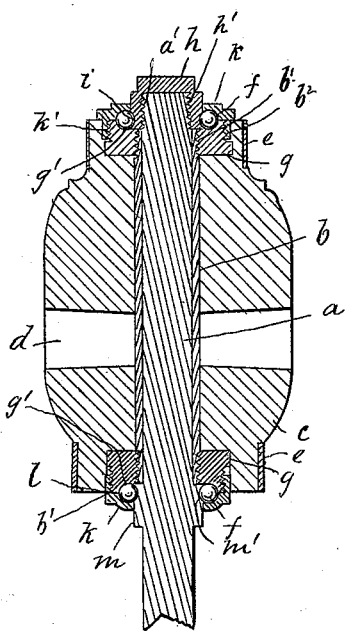
Witnesses
Inventor
Pierre Dansereau.

UNITED STATES PATENT OFFICE.

PIERRE DANSEREAU, OF MONTREAL, CANADA.

BALL-BEARING.

SPECIFICATION forming part of Letters Patent No. 494,190, dated March 28, 1893.

Application filed December 13, 1892. Serial No. 455,092. (No model.)

*To all whom it may concern:*

Be it known that I, PIERRE DANSEREAU, a subject of the Queen of Great Britain, and a resident of the city of Montreal, in the District of Montreal and Province of Quebec, Canada, have invented new and useful Improvements in Ball-Bearings; and I do hereby declare that the following is a full, clear, and exact description of the same.

My invention relates to improvements in ball bearings which may be attached to wooden hubs of any form, particularly those at present in use; and the objects of my improvements are, first, to provide a bearing which may be readily attached to the hub of any carriage or vehicle, that has been in use, without reconstructing it; second, to provide a bearing in which all possible friction is saved; third, to provide ball bearings to vehicles in use at as small a loss of time and expenditure as possible. I attain these objects by the construction shown in the accompanying drawing which represents a longitudinal central section view of a hub and axle embodying my invention.

Similar letters refer to similar parts throughout.

Letter $a$, is the axle having a screw threaded outer end $a'$.

$b$, is an inner tube or lining, of metal, to the hub and has screw threaded ends $b'$.

$c$, is an ordinary wooden hub.

$d$, are the holes for the spokes.

$e$, are ordinary reinforcing ferrules of the hub.

$f$, are ordinary metal balls of the bearing.

$g$, are nuts provided with screw threads to agree with the screw threads $b'$, of the lining $b$. These are provided with a portion $g'$, of the ball race and with an outer screw thread $b^2$.

$h$, is a thimble provided with a screw thread $h'$, on its inner side to correspond with screw thread $a'$, of the axle $a$, and it is also provided with the groove $i$, being a part of the ball race.

$k$, are caps provided with screw threads $k'$, agreeing with the screw threads $b^2$, of the nuts $g$. These are also provided with a groove $l$, being part of the ball race.

$m$, is a collar formed on the axle $a$, having a groove $m'$, and forming a portion of the ball race.

The manner of applying my invention is as follows: I take a wheel and axle and fit a tube or lining $b$, to the hub $c$, of the wheel. To this I attach the outer nut $g$. Next, I form on the axle $a$, the collar $m$, and around this is placed the inner cap $k$, and balls $f$. To this is placed the inner nut $g$, and secured in position. The axle $a$, is then passed through the hub $c$, of the wheel, and the inner nut $g$, is secured to the lining $b$. Next the thimble $h$, is placed in position on the outer end of the axle $a$. The balls $f$, are then introduced and around the thimble $h$, is placed the outer cap $k$, and screwed into position on the outer nut $g$.

What I claim is as follows:

The combination in a wheel and axle, of hub $c$, having lining $b$, axle $a$, having collar $m$, with groove $m'$, and having a screw-threaded outer end: thimble $h$, provided with groove $i$: nuts $g$, and caps $k$, and the balls $f$: the whole arranged substantially as and for the purpose set forth.

PIERRE DANSEREAU.

Witnesses:
   CHARLES G. C. SIMPSON,
   A. A. SIMPSON.